(12) United States Patent
Kanaya

(10) Patent No.: US 6,454,844 B1
(45) Date of Patent: Sep. 24, 2002

(54) INK SET

(75) Inventor: Miharu Kanaya, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/544,864

(22) Filed: Apr. 7, 2000

(30) Foreign Application Priority Data

Apr. 8, 1999 (JP) ............................................. 11-101778

(51) Int. Cl.$^7$ .............................................. C09D 11/02
(52) U.S. Cl. ............................... 106/31.48; 106/31.47; 106/31.49; 106/31.52
(58) Field of Search ........................... 106/31.52, 31.48, 106/31.47, 31.49

(56) References Cited

U.S. PATENT DOCUMENTS

| | | | | |
|---|---|---|---|---|
| 5,534,051 A | * | 7/1996 | Lauw | 106/31.43 |
| 5,536,306 A | * | 7/1996 | Johnson et al. | 106/31.49 |
| 5,833,743 A | | 11/1998 | Elwakil | 106/31.27 |

FOREIGN PATENT DOCUMENTS

| | | | |
|---|---|---|---|
| EP | 0588316 | 3/1994 | |
| EP | 0771860 | 5/1997 | |
| EP | 0802246 | 10/1997 | |
| EP | 0831135 | 3/1998 | |
| EP | 0 927 747 | 7/1999 | ............. C09B/5/14 |
| JP | 57(1982)-5769 | 1/1982 | ........... C09D/11/00 |
| JP | 62(1987)-192474 | 8/1987 | ........... C09D/11/02 |
| JP | 63(1988)-19288 | 1/1988 | ............ B41M/5/00 |
| JP | 02(1990)-127482 | 5/1990 | ........... C09D/11/18 |
| WO | WO 96/24636 | 8/1996 | ........... C09B/43/16 |

OTHER PUBLICATIONS

JPO Abstract 57(1982)–5769, Jan. 12, 1982.
JPO Abstract 62(1987)–192474, Aug. 24, 1987.
JPO Abstract 63(1988)–19288, Jan. 27, 1988.
JPO Abstract 02(1990)–127482, May 16, 1990.

* cited by examiner

*Primary Examiner*—Helene Klemanski
(74) *Attorney, Agent, or Firm*—Ladas & Parry

(57) ABSTRACT

An ink set is provided which can bring good lightfastness and can realize images having excellent color reproduction. The ink set comprises a yellow ink composition, two magenta ink compositions different from each other in color density, and two cyan ink compositions different from each other in color density. The ink compositions contain respective specific compounds as colorants.

18 Claims, No Drawings

INK SET

FIELD OF THE INVENTION

The present invention relates to dye-based color ink sets having excellent color reproduction and lightfastness.

BACKGROUND ART

Images produced by ink compositions, when exposed to indoor or outdoor light beams, the open air for a long period of time, are frequently deteriorated due to an influence of ultraviolet and visible light, various gas in the air. In particular, in the case of color images produced by a plurality of ink compositions, the presence of even one color ink composition having poor lightfastness causes a change in hue of images, resulting in extremely deteriorated quality of color images. This has led to a demand for ink compositions capable of yielding highly weathering-resistant images which, even when stored for a long period of time, are less likely to be deteriorated.

Further, in recent years, attention has been drawn to ink jet recording. The ink jet recording is a printing method wherein droplets of an ink composition are ejected and deposited onto recording media, such as paper, to conduct printing. This method has a feature that images having high resolution and high quality can be printed at a high speed by means of relatively inexpensive apparatuses. Ink jet recording apparatuses utilizing this method are commercially widely accepted by virtue of good print quality, low cost, relatively quiet operation, graphics-forming capability. Among others, thermal (bubble jet) and piezoelectric drop-on-demand printers have been very successful on the market, and have been widely used as printers for personal computers for office and domestic applications.

In recent years, a method has become used wherein a plurality of color ink compositions are provided and used in the formation of color images by ink jet recording. In general, color images are formed using three colors of a yellow ink composition, a magenta ink composition, and a cyan ink composition, and optionally four colors of the above three color compositions plus a black ink composition. In some cases, six colors of the above four colors plus a light cyan ink composition and a light magenta ink composition are used in the formation of color images. What is required, of ink compositions for the formation of such color images is that they as such can exhibit good color development and, in addition, when used in combination with a plurality of ink compositions, can develop good intermediate colors.

Further, ink composition constituting ink sets used in this ink jet recording are required to have properties such that they have suitable property values, such as viscosity and surface tension values, have high optical density, can yield sharp color tone and images, can yield images having excellent fastness properties, such as excellent waterfastness and lightfastness, have excellent storage stability, and are less likely to cause nozzle clogging, are free from a problem associated with an odor, and are safe, for example, are free from the danger of fire. In order to satisfy a large part of these property requirements, water-base inks prepared by dissolving water-soluble dyes in water or in a mixed solution of water and a water-soluble organic solvent have been used. At that time, ink compositions having various hues are prepared from dyes having various hues.

Various image properties, such as color tone, lightfastness, and waterfastness, are greatly influenced by the properties of colorants in the ink compositions, and various dyes have hitherto been studied in the art, printing and photograph.

SUMMARY OF THE INVENTION

The present inventors have now found that ink sets comprising a combination of specific dye-based color ink compositions can realize images having excellent color reproduction and, at the same time, having excellent lightfastness. The present invention has been made based on such finding.

Accordingly, it is an object of the present invention to provide an ink set which can realize images having excellent color reproduction.

Thus, according to one aspect of the present invention, there is provided an ink set comprising: a yellow ink composition; two magenta ink compositions different from each other in color density, a magenta ink composition with higher color density and a magenta ink composition with lower color density; and two cyan ink compositions different from each other in color density, a cyan ink composition with higher color density and a cyan ink composition with lower color density, said yellow ink composition containing as a colorant a compound represented by formula (I) or (II):

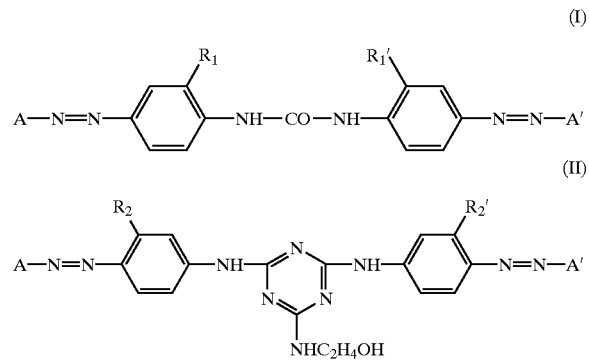

wherein
$R_1$, $R_1'$, $R_2$, and $R_2'$ each independently represent $CH_3$ or $OCH_3$; and
A and A' each independently represent a group having a structure selected from the group consisting of

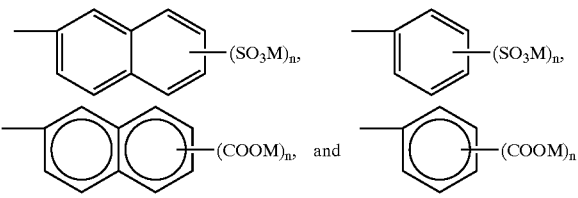

wherein
M represents a hydrogen atom, lithium, sodium, potassium, ammonium, or an organic amine; and
n is an integer of 1 or 2,
said magenta ink composition with higher color density containing as a colorant a compound represented by formula (III):

(III)

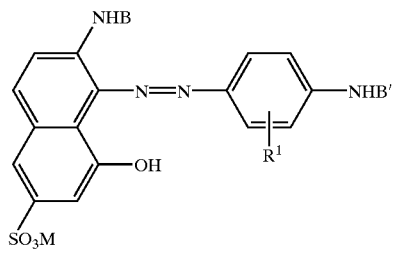

wherein
B and B' each independently represent a hydrogen atom or a group represented by formula

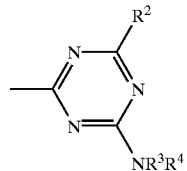

wherein
$R^2$ represents OH, COOM, or $NHR^5$ wherein $R^5$ represents an $SO_3M$— or COOH-substituted $C_1$-$C_4$ alkyl group;
$R^3$ represents a hydrogen atom or an OH— or COOH-substituted $C_1$-$C_4$ alkyl group; and
$R^4$ represents an OH—, $OCH_3$—, $OC_2H_5$—, $SO_3M$—, or COOM-substituted $C_1$-$C_4$ alkyl or phenyl group, provided that B and B' do not simultaneously represent a hydrogen atom;
$R^1$ represents a $C_1$-$C_4$ alkyl or alkoxy group, OH, $SO_3M$, or COOH; and
M represents a hydrogen atom, lithium, sodium, potassium, ammonium, or an organic amine,
said magenta ink composition with lower color density containing as a colorant the compound represented by formula (III) or a compound represented by formula (V):

(V)

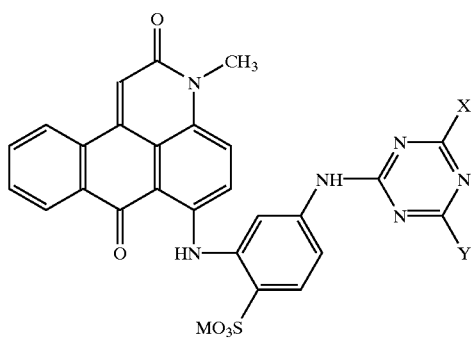

wherein
x represents an anilino group substituted by at least one $SO_3M$;
Y represents OH, Cl, or a morpholino group; and
M represents a hydrogen atom, lithium, sodium, potassium, ammonium, or an organic amine,
said cyan ink composition with higher color density and said cyan ink composition with lower color density each containing as a colorant a compound represented by formula (IV):

(IV)

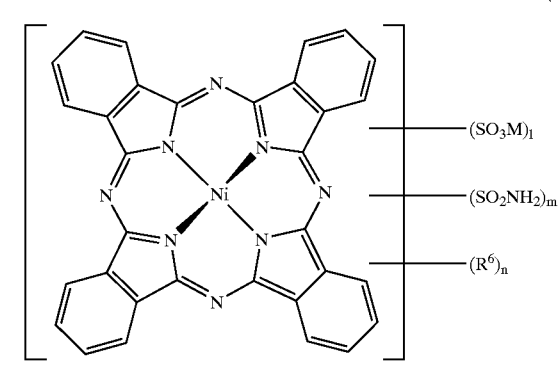

wherein
$R^6$ represents OH or COOM; and
l, m, and n are each 0 to 4 with (l+m+n)=4.

According to another aspect of the present invention, there is provided an ink set comprising two magenta ink compositions different from each other in color density, a magenta ink composition with higher color density and a magenta ink composition with lower color density, the magenta ink composition with higher color density containing as a colorant the compound represented by formula (III), the magenta ink composition with lower color density containing as a colorant the compound represented by formula (V).

According to the ink set of the present invention, the presence of specific compounds as the colorant in the respective ink compositions can significantly improve the color reproduction of printed images and can yield images having improved lightfastness.

DESCRIPTION OF THE PREFERRED EMBODIMENTS

Ink Set

The ink set according to the present invention may be used in recording methods using an ink composition. Recording methods using an ink composition include, for example, an ink jet recording method, a recording method using writing utensils, such as pens, and other various recording methods. Preferably, the ink composition according to the present invention is used in the ink jet recording method.

The ink set according to the present invention basically comprises a yellow ink composition, two magenta ink compositions different from each other in color density, and two cyan ink compositions different from each other in color density. The two ink compositions different from each other in color, density may be divided into an ink composition with higher color density and an ink composition with lower color density.

Yellow ink composition

The yellow ink composition to be used in the present invention contains as a colorant a compound represented by formula (I) or (II). According to the present invention, compounds represented by formula (I) or (II) as the colorant may be used alone or as a mixture of two or more.

Specific examples of compounds represented by formula (I) or (II) include the following compounds.

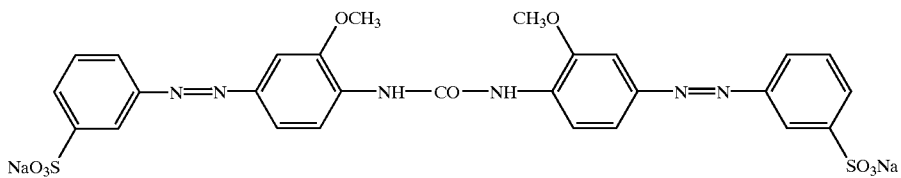
(Y-1)
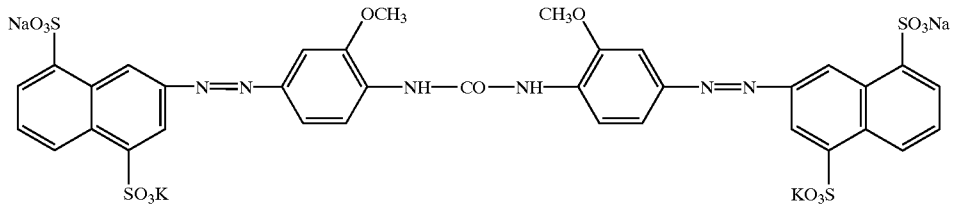
(Y-2)
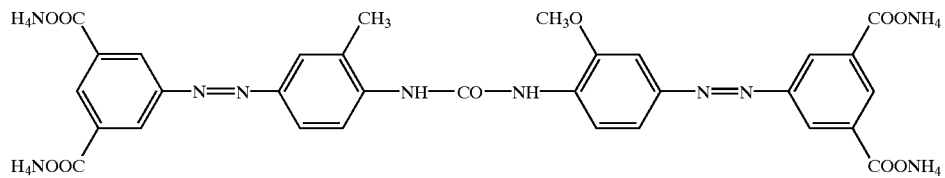
(Y-3)
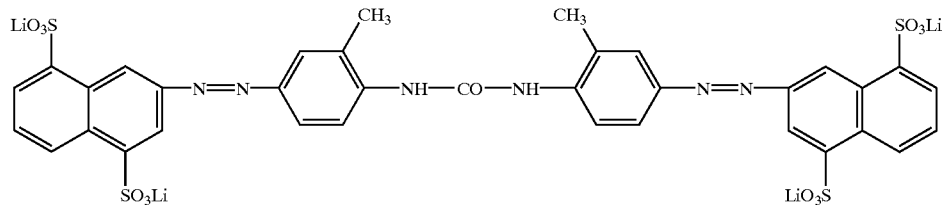
(Y-4)
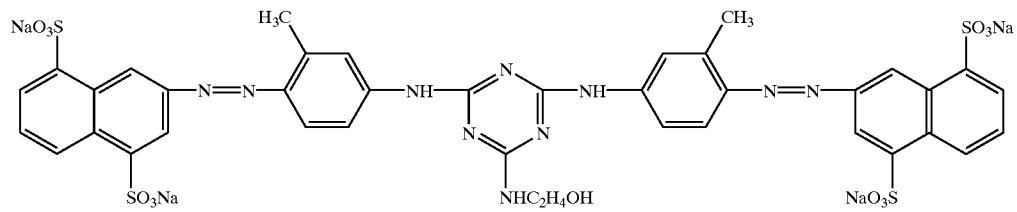
(Y-5)
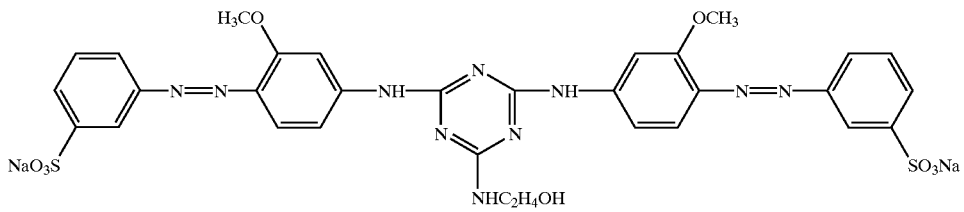
(Y-6)
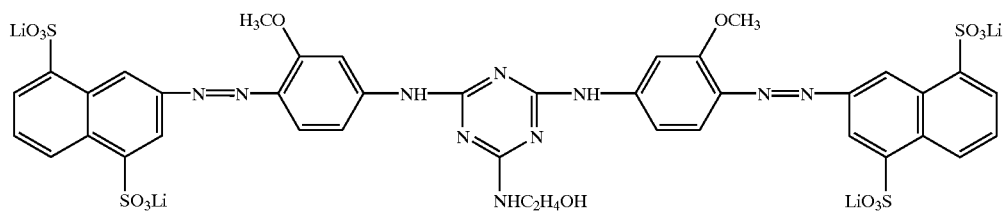
(Y-7)

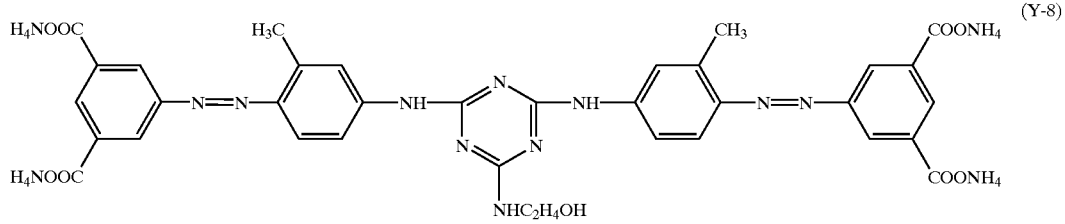

(Y-8)

The concentration of the colorant in the yellow ink composition may be suitably selected. In general, however, the ink composition preferably contains 1.5 to 6.0% by weight of the compound represented by formula (I) or (II). This concentration range is preferred also from the viewpoint of the balance between the magenta ink composition and the cyan ink composition. Further, when the formation of blotted images (solid printing with 100% duty) on the so-called "plain papers" is carried out, the OD value of yellow is preferably in the range of 1.0 to 1.5. Therefore, the content[ o]f the compound represented by formula (I) or (II) in the yellow ink composition is more preferably 1.5 to 4.0% by weight.

Magenta ink compositions

The two magenta ink compositions different from each other in color density to be used in the ink set according to the present invention are composed of a magenta ink composition with higher color density (hereinafter often referred to as "deep magenta ink") and a magenta ink composition with lower color density (hereinafter often referred to as "light magenta ink"). Ink jet recording using a deep magenta ink and a light magenta ink can provide recorded images having high sharpness and excellent lightfastness.

The magenta ink composition with higher color density to be used in the present invention contains as a colorant the compound represented by formula (III). The ink composition containing this compound as such, that is, when used in the formation of a single-color image, can yield images having excellent sharpness and lightfastness.

Specific examples of compounds represented by formula (III) include the following compounds.

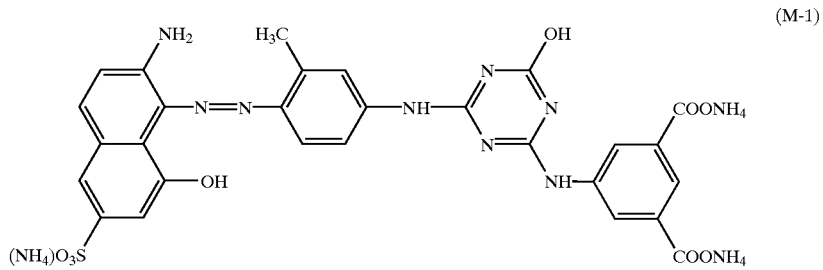

(M-1)

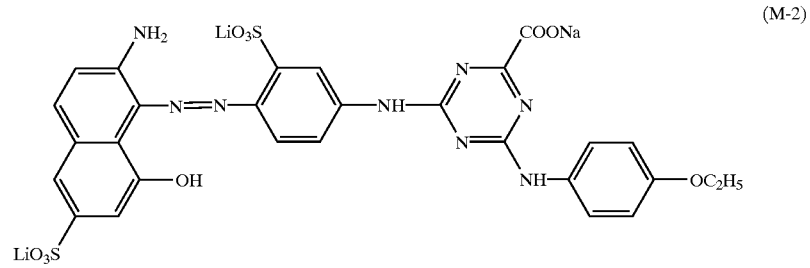

(M-2)

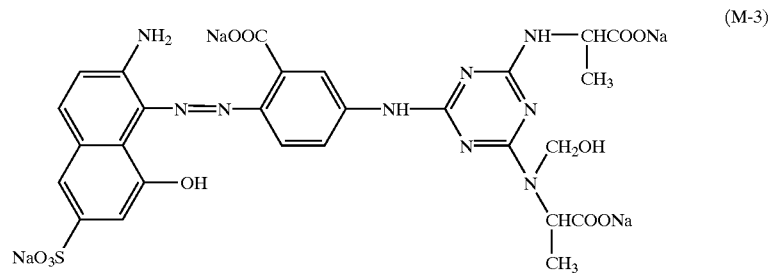

(M-3)

-continued
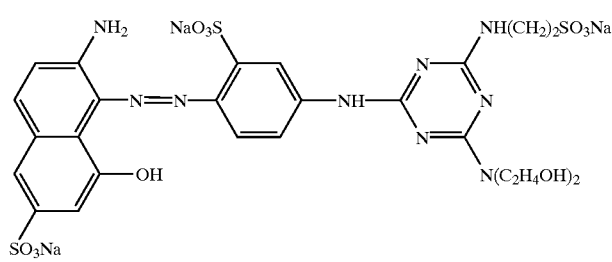
(M-4)
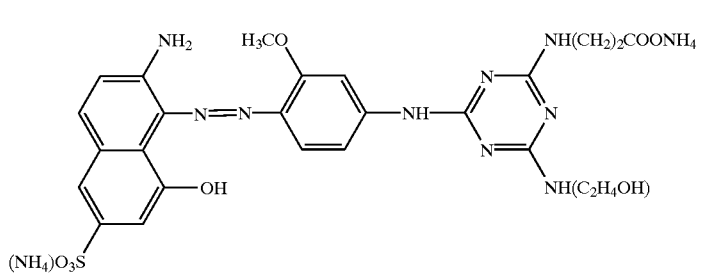
(M-5)
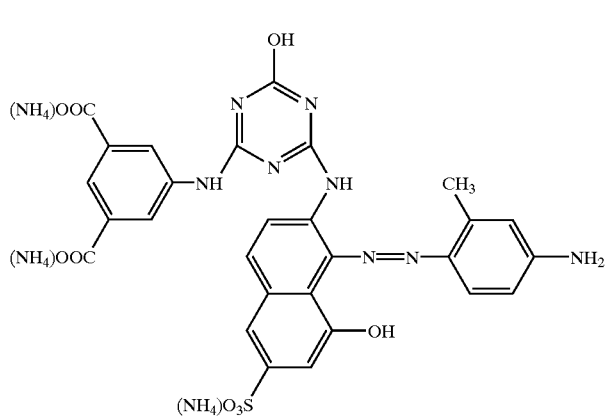
(M-6)
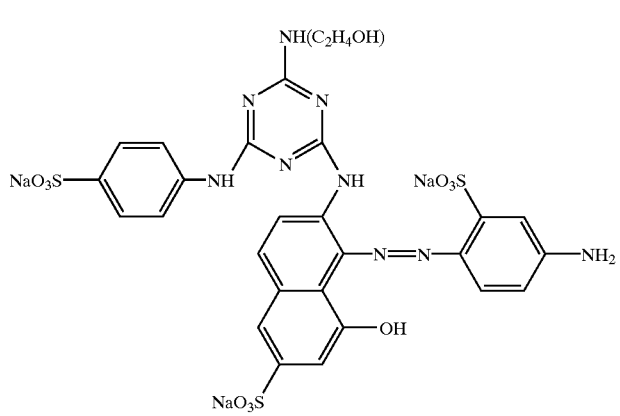
(M-7)

-continued

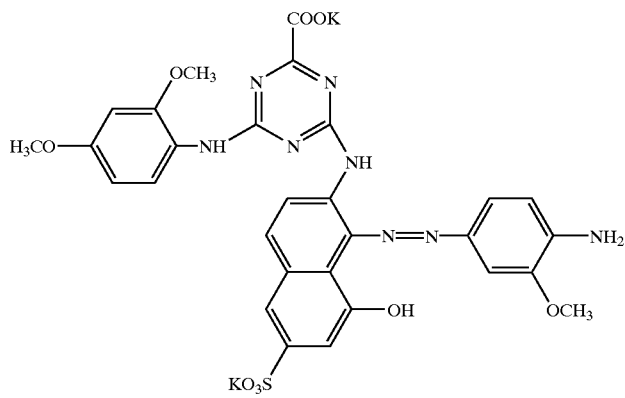

(M-8)

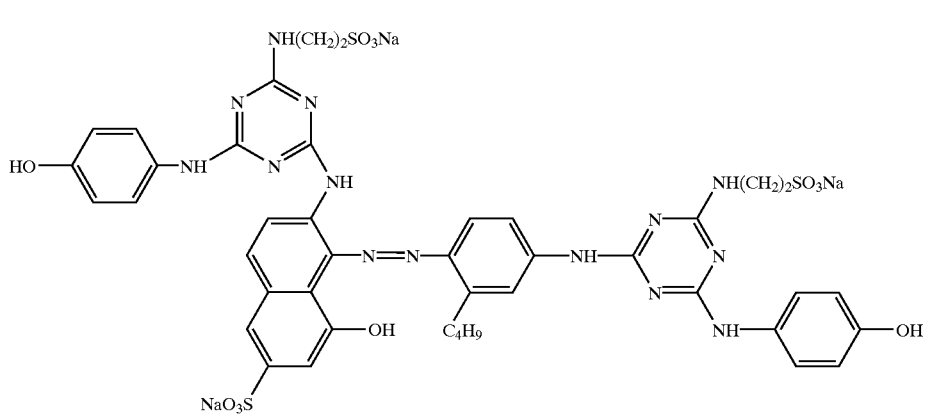

(M-9)

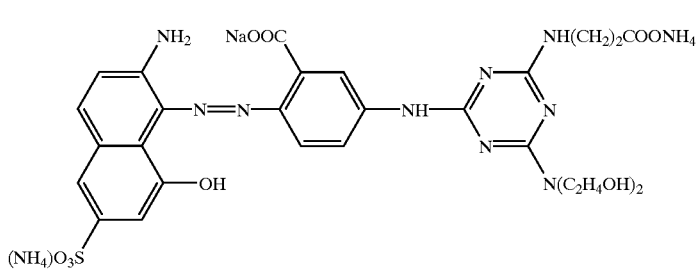

(M-10)

According to the present invention, compounds represented by formula (III) may be used alone or as a mixture of two or more.

When the compound represented by formula (III) is used in the light magenta ink described later, the magenta ink composition with higher color density preferably contains 1.5 to 3.5% by weight of the compound represented by formula (III). On the other hand, when the compound represented by formula (V) is used in the light magenta ink described later, the magenta ink composition with higher color density preferably contains 0.5 to 4.0% by weight of the compound represented by formula (III). According to this preferred embodiment, when the formation of blotted images (solid printing with 100% duty) on the so-called "plain papers" is carried out, the OD value f magenta ink is in the range of 1.0 to 1.5.

According to the present invention, the colorant usable in the magenta ink composition with lower color density is the compound represented by formula (III) or (V). The compound represented by formula (III) to be used in the light magenta ink may be selected from the compounds as used in the deep magenta ink.

Specific examples of compounds represented by formula (V) include the following compounds.

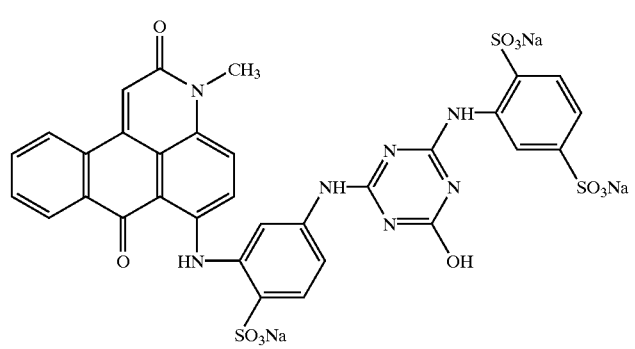
(LM-1)
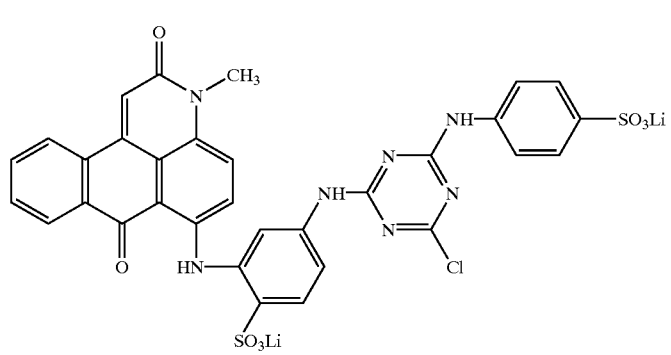
(LM-2)
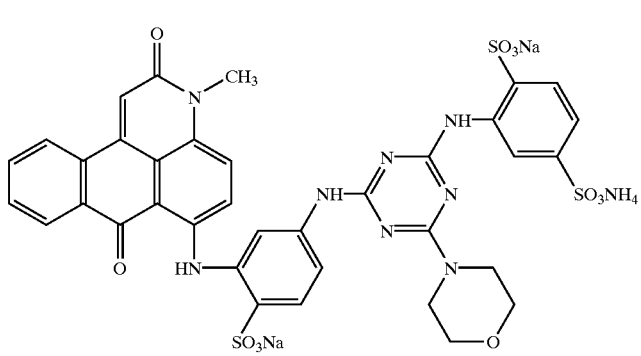
(LM-3)
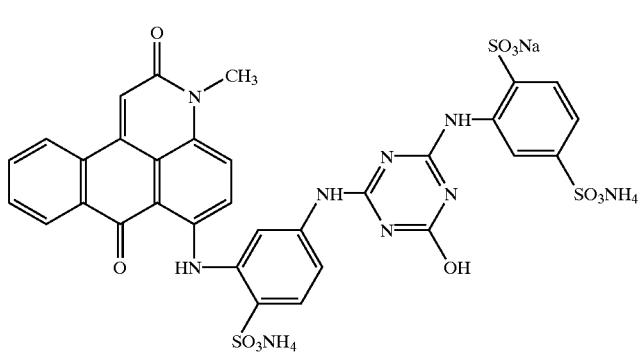
(LM-4)

-continued
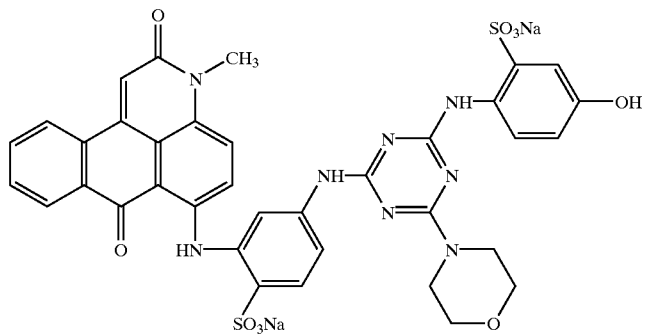
(LM-5)
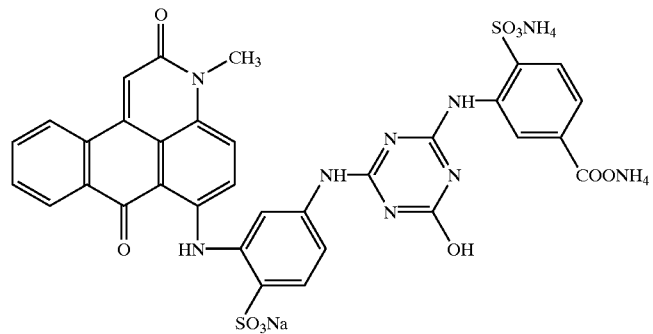
(LM-6)
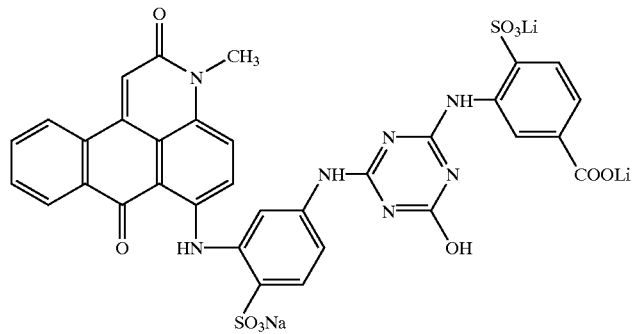
(LM-7)
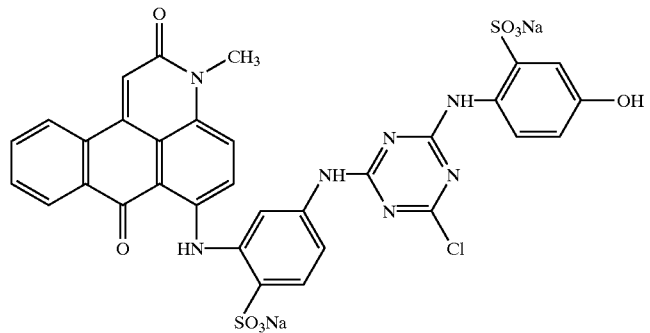
(LM-8)

-continued

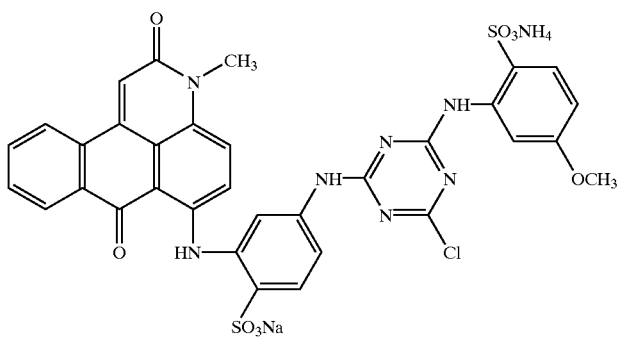
(LM-9)

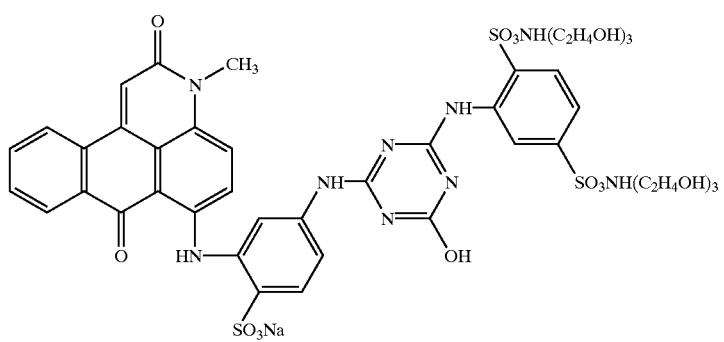
(LM-10)

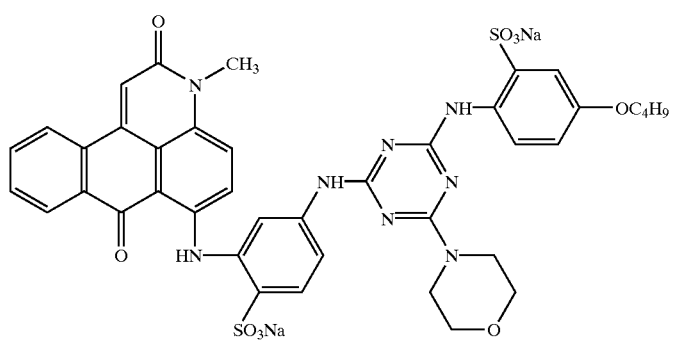
(LM-11)

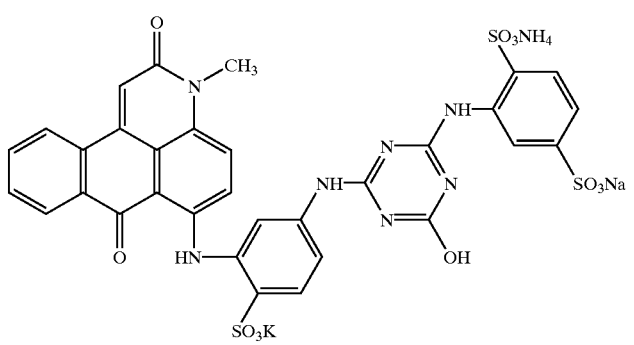
(LM-12)

According to the present invention, compounds represented by formula (V) may be used alone or as a mixture of two or more.

The concentration of the colorant in the magenta ink composition with lower color density may be properly selected according to the color balance between the light magenta ink and the deep magenta ink used in combination with the light magenta ink. In general, however, when the compound represented by formula (III) is used in the light magenta ink, the light magenta ink preferably contains 0.2 to 0.9% by weight of the compound represented by formula (III). On the other hand, when the compound represented by formula (V) is used in the light magenta ink, the light magenta ink preferably contains 1 to 3% by weight of the compound represented by formula (V). When the compound represented by formula (III) or (V) falls within the above concentration range, the magenta ink composition with lower color density, when used in combination with the magenta ink composition with higher color density, can offer a good color balance between the deep magenta ink and the light magenta ink.

The combination of the above magenta ink compositions constitutes another aspect of the present invention. Thus, according to another aspect of the present invention, there is provided a magenta ink set comprising two magenta ink compositions different from each other in color density, a magenta ink composition with higher color density and a magenta ink composition with lower color density, the magenta ink composition with higher color density containing as a colorant the compound represented by formula (III), the magenta ink composition with lower color density containing the compound represented by formula (V). The magenta ink set according to the present invention may be used in combination with any ink composition without limitation. Specifically, for the magenta ink set, the formulations and the like may be the same as those of the magenta ink compositions described above, except that the, magenta ink set may be used in combination with a desired yellow ink composition, a desired cyan ink composition, and optionally a desired black ink composition. The magenta ink set according to the present invention can realize highly light-fast and sharp images.

Cyan ink compositions

The two cyan ink compositions different from each other in color density to be used in the ink set according to the present invention are composed of a cyan ink composition with higher color density (hereinafter often referred to as "deep cyan ink") and a cyan ink composition with lower color density (hereinafter often referred to as "light cyan ink").

The cyan ink composition with higher color density and the cyan ink composition with lower color density to be used in the present invention each contain as the colorant the compound represented by formula (IV).

The difference in color density between the ink compositions different from each other in color density may be provided by using two ink compositions having different dye concentrations, or by properly selecting the types of colorants used.

Specific examples of compounds represented by formula (IV) include the following compounds.

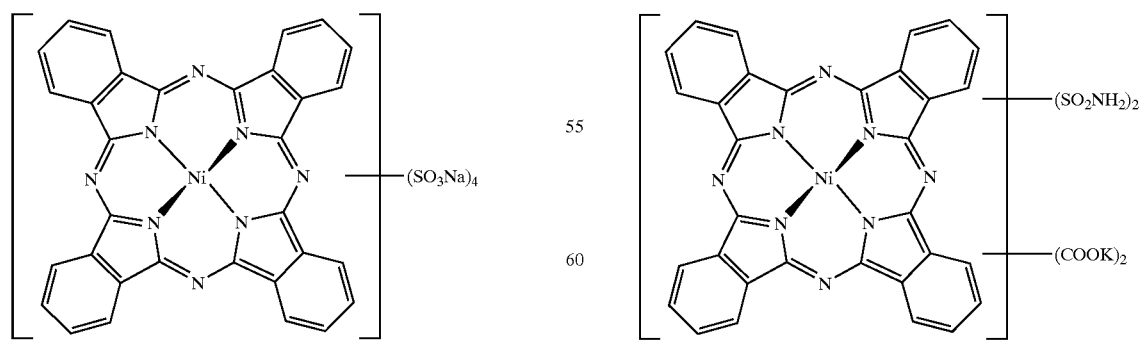

(C-1)

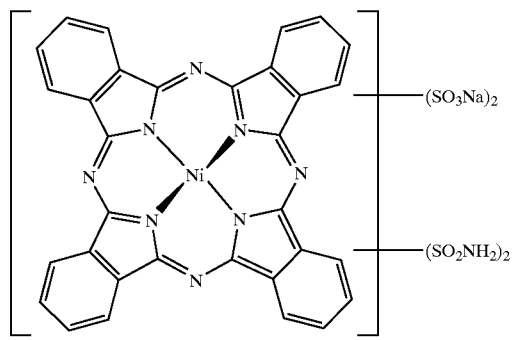

(C-2)

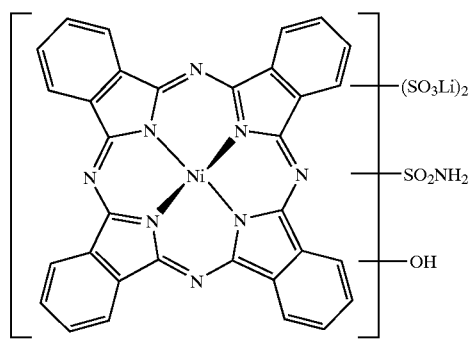

(C-3)

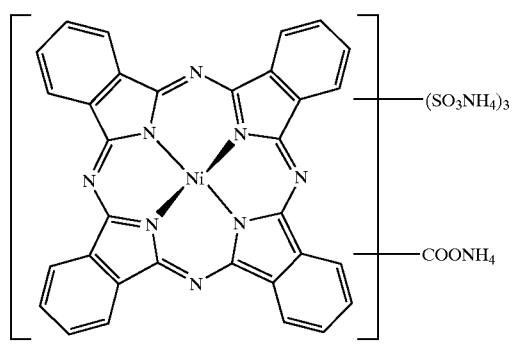

(C-4)

(C-5)

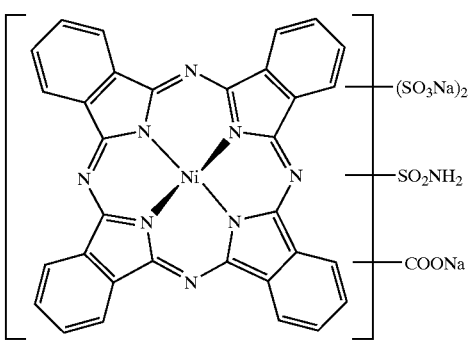

(C-6)

Regarding the colorant to be used in the cyan ink composition with higher color density and the colorant to be used in the cyan ink composition with lower color density according to the present invention, compounds represented by formula (IV) may be used alone or as a mixture of two or more.

The concentration of the colorant in the cyan ink composition with higher color density may be properly selected. In general, however, the cyan ink composition with higher color density preferably contains 2.0 to 6.0% by weight of the compound represented by formula (IV). Further, when the formation of blotted images (solid printing with 100% duty) on the so-called "plain papers" is carried out, the OD value of cyan is preferably in the range of 1.0 to 1.5. Therefore, the content of the compound represented by formula (IV) in the cyan ink composition with higher color density is more preferably 2.5 to 4.5% by weight.

The concentration of the colorant in the cyan ink composition with lower color density may be properly selected according to the color balance between the compound represented by formula (IV) used as the colorant and the deep cyan ink used in combination with the light cyan ink. In general, preferably, the cyan ink composition with lower color density contains 0.4 to 1.5% by weight of the compound represented by formula (IV). When the cyan ink composition with lower color density contains the colorant in the above concentration range, the cyan ink composition with lower color density, when used in combination with the cyan ink composition with higher color density, can offer a good color balance.

Black ink composition

According to the present invention, the link set comprising a yellow ink composition, two magenta ink compositions different from each other in color density, and two cyan ink compositions different from each other in color density may further comprise a black ink composition.

Any dye or pigment capable of yielding a black print may be used as a colorant contained in the black ink composition according to the present invention. Such dyes include, for example, various dyes commonly used in ink compositions, especially used in ink jet recording, such as direct dyes, acid dyes, foodstuff dyes, basic dyes, reactive dyes, disperse dyes, vat dyes, soluble vat dyes, and reactive disperse dyes. Such pigments include black pigments such as carbon black.

The black ink composition according to the present invention is preferably water-base inks from the viewpoint of safety and the like.

According to the present invention, these dyes may be contained, either alone or as a mixture of two or more, in the black ink composition.

Water, water-soluble organic solvent, and other optional ingredients

In the ink compositions to be used in the present invention, water or a mixed solution composed of water and a water-soluble organic solvent is suitable as a main solvent. Water may be pure water obtained by ion exchange, ultrafiltration, reverse osmosis, distillation or the like, or ultrapure water. Further, water, which has been sterilized by ultraviolet irradiation or by addition of hydrogen peroxide, is suitable because, when the ink composition is stored for a long period of time, it can prevent the growth of mold or bacteria.

In the ink compositions to be used in the present invention, when water is used as the main solvent, the water content is preferably 50 to 90% by weight, more preferably 60 to 80% by weight, based on the ink composition.

The solvent in the ink compositions to be used in the present invention is a mixed solution composed of water and a water-soluble organic solvent. Preferably, the solvent further contains a wetting agent comprising a high-boiling organic solvent. Preferred examples of high-boiling organic solvents usable herein include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether; urea; 2-pyrrolidone and N-methyl-2-pyrrolidone; 1,3-dimethyl-2-imidazolidinone; formamide; acetamide; dimethyl sulfoxide; sorbit; sorbitan; acetin; diacetin; triacetin; and sulfolane. They may be used alone or in combination of two or more. Specific examples of preferred acetylene glycol surfactants usable in the present invention include compounds represented by the following formula (a):

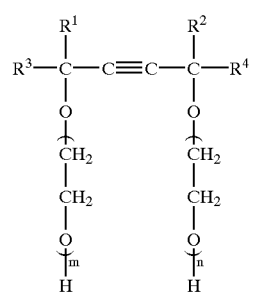

(a)

wherein $0 \leq m+n \leq 50$; and $R^1$, $R^2$, $R^3$, and $R^4$ each independently represent an alkyl group (preferably an alkyl group having 1 to 6 carbon atoms).

Among the compounds represented by formula (a), particularly preferred compounds include 2,4,7,9-tetramethyl- 5-decyne-4,7-diol, 3,6-dimethyl-4-octyne-3,6-diol, and 3,5-dimethyl-1-hexyn-3-ol. Commercially available products may also be used as the acetylene glycol surfactant represented by the formula (a). Specific examples thereof include Surfynol 82, Surfynol 104, Surfynol 440, Surfynol 465, Surfynol 485, and Surfynol TG (all the above products being available from Air Products and Chemicals Inc.) and OLFINE STG and OLFINE E 1010 (tradenames: manufactured by Nissin Chemical Industry Co., Ltd.).

The amount of the surfactant added is preferably about 0.1 to 3% by weight, more preferably about 0.5 to 2% by weight, based on the ink composition. The surface tension of the ink compositions to be used in the present invention is generally not more than 45 mN/m, preferably about 25 to 40 mN/m.

If necessary, the ink compositions to be used in the present invention may further containing nozzle clogging preventives, preservatives or antimolds, antioxidants, electric conductivity adjustors, pH adjustors, solubilizers, viscosity modifiers, penetrants, surface tension modifiers, oxygen absorbers, etc.

Examples of preservatives or antimolds include sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by Zeneca).

Examples of pH adjustors, solubilizers, or antioxidants usable in the ink compositions include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanates, such as allophanate and methyl allophanate; biurets, such as biuret, dimethylbiuret, and tetramethylbiuret; and L-ascorbic acid and salts thereof.

According to the present invention, the other optional ingredients may be used alone, or alternatively a plurality of optional ingredients may be selected from the same category or different categories and used as a mixture.

According to the present invention, for each ink composition, the amounts of all the ingredients are preferably selected so that the ink composition has a viscosity of less than 10 mPa·s at 20° C.

Recording Method

The ink set according to the present invention may be used in a recording method comprising the step of depositing an ink composition onto a recording medium to perform printing.

According to still another aspect of the present invention, there is provided an ink jet recording method comprising the steps of: ejecting droplets of an ink composition contained in the ink set according to the present invention; and depositing the droplets onto a recording medium to perform printing.

According to a further aspect of the present invention, there is provided a record produced by any one of these recording methods.

EXAMPLES

The following examples further illustrate the present invention, but should not be construed as limiting the scope of the present invention.

Evaluation Test A

Preparation of ink compositions

Deep magenta ink compositions 1M to 8M and light magenta ink compositions 1LM to 8LM were prepared according to formulations specified in the following tables.

In the following tables, the amount of each ingredient is in wt % of the ingredient based on the total weight of the ink composition. The balance consists of ion-exchanged water. Dyes M-1 to M-10 and LM-1 to LM-12 are dyes having respective structures noted above.

TABLE 1

| | Deep magenta ink | | | | | | | |
|---|---|---|---|---|---|---|---|---|
| | 1M | 2M | 3M | 4M | 5M | 6M (comp. ex.) | 7M (comp. ex.) | 8M (comp. ex.) |
| Dye | (M-1) 2.0 | (M-4) 2.7 | (M-7) 3.5 | (M-10) 1.0 | (M-4) 2.5 (M-10) 2.5 | C.I. Acid Red 52 2.0 | C.I. Acid Red 227 4.0 | C.I. Acid Red 180 2.7 |
| Glycerin | 10 | 10 | 5 | 10 | 10 | 10 | 10 | 10 |
| Diethylene glycol | | 11 | 5 | 5 | 5 | 13 | 13 | 13 |
| Triethylene glycol | 10 | | 8 | | | | | |
| Triethanolamine | 1 | 1 | | | | | | |
| 2-Pyrrolidone | | | 2 | | | | | |
| 1,3-Dimethyl-2-imidazolidinone | | | 5 | | 8 | | | |
| Urea | | | | 5 | | | | |
| Diethylene glycol monobutyl ether | 10 | | | | | | | |
| Triethylene glycol monobutyl ether | | 10 | | 10 | | 10 | 10 | 10 |
| Dipropylene glycol monobutyl ether | | | 10 | | | | | |
| Olfine STG | 0.5 | | | | 3 | | | |
| Olfine E 1010 | | 1 | | | | 1 | 1 | 1 |
| Olfine E 104 | | | | 0.5 | | | | |
| EDTA* | 0.02 | 0.02 | 0.02 | 0.02 | 0.02 | 0.02 | 0.02 | 0.02 |
| Proxel XL-2** | 0.3 | 0.3 | 0.3 | 0.3 | 0.3 | 0.3 | 0.3 | 0.3 |
| Benzotriazole*** | 0.01 | 0.01 | 0.01 | 0.01 | 0.01 | 0.01 | 0.01 | 0.01 |

TABLE 1-continued

| | \multicolumn{8}{c}{Deep magenta ink} | | | | | | | |
| --- | --- | --- | --- | --- | --- | --- | --- |
| | 1M | 2M | 3M | 4M | 5M | 6M (comp. ex.) | 7M (comp. ex.) | 8M (comp. ex.) |
| Potassium hydroxide | 0.1 | 0.1 | | | 0.05 | | | |

Note)
EDTA*: Sodium ethylenediamine tetraacetate (metal masking agent)
Proxel XL-2**: Preservative (a product of Zeneca K.K.)
Benzotriazole***: Rust preventive

TABLE 2

| | \multicolumn{8}{c}{Light magenta ink} | | | | | | | |
| --- | --- | --- | --- | --- | --- | --- | --- | --- |
| | 1LM | 2LM | 3LM | 4LM | 5LM | 6LM (comp. ex.) | 7LM (comp. ex.) | 8LM (comp. ex.) |
| Dye | (LM-1) 1.5 | (LM-4) 2.0 | (LM-7) 3.0 | (LM-10) 0.5 | (LM-4) 2.0 (LM-10) 2.0 | C.I. Acid Red 52 0.5 | C.I. Acid Red 82 2.5 | (M-1) 0.7 |
| Glycerin | 10 | 10 | 5 | 10 | 10 | 10 | 10 | 10 |
| Diethylene glycol | | 13 | 5 | 5 | 5 | 15 | 15 | 15 |
| Triethylene glycol | 10 | | 10 | | | | | |
| Triethanolamine | | 1 | | | | | | 0.5 |
| 2-Pyrrolidone | 2 | | | | | | | |
| 1,3-Dimethyl-2-imidazolidinone | | | 5 | | 8 | | | |
| Urea | | | | | 5 | | | |
| Diethylene glycol monobutyl ether | 10 | | | | | | | |
| Triethylene glycol monobutyl ether | | 10 | | 10 | | 10 | 10 | 10 |
| Dipropylene glycol monobutyl ether | | | 10 | | | | | |
| Olfine STG | 0.5 | | | | 3 | | | |
| Olfine E 1010 | | 1 | | | | 1 | 1 | 1 |
| Olfine E 104 | | | | 0.5 | | | | |
| EDTA* | 0.02 | 0.02 | 0.02 | 0.02 | 0.02 | 0.02 | 0.02 | 0.02 |
| Proxel XL-2** | 0.3 | 0.3 | 0.3 | 0.3 | 0.3 | 0.3 | 0.3 | 0.3 |
| Benzotriazole*** | 0.01 | 0.01 | 0.01 | 0.01 | 0.01 | 0.01 | 0.01 | 0.01 |
| Potassium hydroxide | | 0.1 | | | 0.05 | | | 0.05 |

Note)
EDTA*: Sodium ethylenediamine tetraacetate (metal masking agent)
Proxel XL-2**: Preservative (a product of Zeneca K.K.)
Benzotriazole***: Rust preventive Test on evaluation of ink sets The ink sets thus obtained were evaluated by the following tests 1A to 4A using the following recording media (1) to (4). The recording medium (1) is the so-called "plain paper," and the recording media (2) to (4) are specialty media for ink jet printers.

Recording media:
(1) Xerox 4024 (Xerox Corp., U.S.A.)
(2) EPSON Superfine Paper (Epson Hanbai Corporation)
(3) EPSON Photo Glossy Paper (Epson Hanbai Corporation)
(4) EPSON Glossy Film (Epson Hanbai Corporation)

In the evaluation tests, an ink jet printer PM-770C (manufactured by Seiko Epson Corporation) was used.

The lightfastness was evaluated by a lightfastness test using a xenon fadeometer Ci35W (manufactured by Atlas Electric Device) as an acceleration tester for fastness to light.

Test 1A: Lightfastness of magenta ink compositions

For the deep magenta ink compositions and the light magenta ink compositions, the formation of blotted images (solid printing) of single colors was carried out on the recording media (1) to (4).

These print samples were subjected to a 60-hr lightfastness test using a xenon fadeometer Ci35W (manufactured by Atlas Electric Device). The difference between the color before the test and the color after the test, $\Delta E^*_{ab}$, was determined by equation (i), and evaluated according to the following criteria.

$$\Delta E^*_{ab} = [(\Delta L^*)^2 + (\Delta a^*)^2 + (\Delta b^*)^2]^{1/2} \quad (i)$$

A: Color difference $\Delta E^*_{ab}$ of not more than 5
B: Color difference $\Delta E^*_{ab}$ of more than 5 to 10
C: Color difference $\Delta E^*_{ab}$ of more than 10 to 20
D: Color difference $\Delta E^*_{ab}$ of more than 20

Test 2A: Recovery from clogging

Each of the magenta ink compositions 1M to 8M and 1LM and 8LM was loaded into a printing head of PM-770C, and allowed to stand without capping the printing head under an environment of 40° C. for one month. After the standing for one month, the number of cleaning operations required for all the nozzles to normally eject the ink compositions was counted, and the recovery from clogging was evaluated according to the following criteria.

A: Recovered by repeating the cleaning operation twice or less

B: Recovered by repeating the cleaning operation three to five times

C: Recovered by repeating the cleaning operation six to ten times

D: Not recovered even by repeating the cleaning operation ten times

The results of evaluation in the test 1A land the test 2A were as summarized in Table 3.

TABLE 3

|  |  | Test 1A: Lightfastness Recording medium | | | | Test 2A |
|---|---|---|---|---|---|---|
|  |  | (1) | (2) | (3) | (4) |  |
| Deep magenta ink | 1M | A | A | A | A | A |
|  | 2M | A | A | A | A | A |
|  | 3M | A | A | A | A | B |
|  | 4M | A | A | A | A | A |
|  | 5M | A | A | A | A | C |
|  | 6M | D | D | D | D | A |
|  | 7M | C | D | C | B | C |
|  | 8M | C | C | B | B | B |
| Light magenta ink | 1LM | B | B | B | A | A |
|  | 2LM | A | A | A | A | A |
|  | 3LM | A | A | A | A | A |
|  | 4LM | B | B | C | B | A |
|  | 5LM | A | A | A | A | C |
|  | 6LM | D | D | D | D | A |
|  | 7LM | B | C | C | C | D |
|  | 8LM | A | A | A | A | A |

The deep magenta ink compositions and the light magenta ink compositions were combined as specified in Table 4 and loaded respectively into a deep magenta ink composition chamber and a light magenta ink composition chamber in an ink cartridge for PM-770C (Model: IC5CL02, manufactured by Seiko Epson Corporation). Thus, ink sets 1a to 11a were prepared. For each of the ink sets 1a to 11a, blotted images of red, blue, and composite black with a density of 70% were printed on the recording media (1) to (4).

In this case, printing was carried out under conditions controlled such that the red with a density of 70% was constituted by the deep magenta ink, the light magenta ink, and the yellow ink, the blue with a density of 70% was constituted by the deep magenta ink, the light magenta ink, the deep cyan ink, and thee light cyan ink, and the composite black with a density, of 70% was constituted by the deep magenta ink, the light magenta ink, the deep cyan ink, the light cyan ink, the yellow ink, and the black ink.

The yellow ink, the deep cyan ink, the light cyan ink, and the black ink used were original inks for an ink cartridge for PM-770C.

TABLE 4

| Ink set | | Deep magenta ink | Light magenta ink |
|---|---|---|---|
| Ink set | 1a | 1 M | 1 LM |
|  | 2a | 2 M | 2 LM |
|  | 3a | 3 M | 3 LM |
|  | 4a | 4 M | 4 LM |
|  | 5a | 5 M | 5 LM |
|  | 6a (comp. ex.) | 6 M | 6 LM |

TABLE 4-continued

|  | Deep magenta ink | Light magenta ink |
|---|---|---|
| 7a (comp. ex.) | 7 M | 1 LM |
| 8a (comp. ex.) | 8 M | 1 LM |
| 9a (comp. ex.) | 8 M | 8 LM |
| 10a (comp. ex.) | 1 M | 7 LM |
| 11a (comp. ex.) | 1 M | 8 LM |

These print samples were inspected for color bleeding or uneven color mixing in boundaries of different colors. The results were evaluated according to the following criteria.

A: There was no bleeding.

B: There was color bleeding or uneven color mixing, in slight portion, on a level causing no practical problem.

C: There was significant color bleeding or uneven color mixing on a level causing slight practical problem.

D: There was severe color bleeding.

The evaluation results of the tests 3A were as summarized in Table 5.

TABLE 5

|  | Test 4A: Bleeding Recording medium | | | |
|---|---|---|---|---|
|  | (1) | (2) | (3) | (4) |
| Ink set 1a | A | A | A | A |
| Ink set 2a | A | A | A | A |
| Ink set 3a | B | A | A | B |
| Ink set 4a | A | A | A | A |
| Ink set 5a | B | A | A | C |
| Ink set 6a | A | A | A | A |
| Ink set 7a | A | A | A | A |
| Ink set 8a | A | A | A | A |
| Ink set 9a | A | A | A | A |
| Ink set 10a | A | A | A | A |
| Ink set 11a | A | A | A | A |

Evaluation Test B

Preparation of ink set

Ink compositions were prepared according to formulations specified in the following tables, and were then used in combination to prepare ink sets 1b to 4b, ink sets 1c to 4c, and sets 5 to 7 (comparative examples).

In the following tables, the amount of each ingredient is in wt % of the ingredient based on the total weight of the ink composition. The balance consists of ion-exchanged water. Dyes Y-1 to Y-8, M-1 to M-10, LM-1 to LM-12, and C-1 to C-6 are dyes having respective structures noted above.

TABLE 6

|  |  | Yellow | Deep magenta | Light magenta | Deep cyan | Light cyan |
|---|---|---|---|---|---|---|
| Ink set 1b | | | | | | |
| Dye | Yellow | (Y-1) 1.2 | | | | |
|  |  | (Y-5) 1.2 | | | | |
|  | Deep magenta | | (M-1) 2.8 | | | |
|  | Light magenta | | | (M-1) 0.7 | | |
|  | Deep cyan | | | | (C-1) 4.0 | |
|  | Light cyan | | | | | (C-1) 1 |
| Glycerin | | 10 | 10 | 10 | 10 | 10 |
| Triethylene glycol | | 8 | 5 | 10 | 5 | 10 |
| Triethanolamine | | | 1 | 0.3 | | |
| Diethylene glycol monobutyl ether | | 10 | | | | |
| Triethylene glycol monobutyl ether | | | 10 | 10 | 10 | 10 |
| Olfine STG | | 1 | | | | |
| Olfine E 1010 | | | 1 | 1 | 1 | 1 |
| EDTA* | | 0.02 | 0.02 | 0.02 | 0.02 | 0.02 |
| Proxel XL-2** | | 0.3 | 0.3 | 0.3 | 0.3 | 0.3 |
| Benzotriazole*** | | 0.01 | 0.01 | 0.01 | 0.01 | 0.01 |
| Potassium hydroxide | | | 0.1 | 0.03 | | |
| Ink set 2b | | | | | | |
| Dye | Yellow | (Y-5) 0.5 | | | | |
|  |  | (Y-8) 3 | | | | |
|  | Deep magenta | | (M-4) 2.4 | | | |
|  | Light magenta | | | (M-4) 0.6 | | |
|  | Deep cyan | | | | (C-2) 4.5 | |
|  | Light cyan | | | | | (C-2) 1.2 |
| Diethylene glycol | | 5 | 5 | 5 | 5 | 5 |
| Triethylene glycol | | 12 | 10 | 18 | 9 | 15 |
| Triethanolamine | | 1 | 1 | | | |
| 2-Pyrrolidone | | | 5 | 2 | | |
| Diethylene glycol monobutyl ether | | 10 | 10 | 10 | 10 | 10 |
| Olfine E 1010 | | | 1 | 1 | 1 | 1 |
| Olfine E 104 | | 1 | | | | |
| EDTA* | | 0.02 | 0.02 | 0.02 | 0.02 | 0.02 |
| Proxel XL-2** | | 0.3 | 0.3 | 0.3 | 0.3 | 0.3 |
| Benzotriazole*** | | 0.01 | 0.01 | 0.01 | 0.01 | 0.01 |
| Potassium hydroxide | | 0.1 | | | | |
| Ink set 3b | | | | | | |
| Dye | Yellow | (Y-4) 2 | | | | |
|  | Deep magenta | | (M-7) 3 | | | |
|  | Light magenta | | | (M-9) 0.5 | | |
|  | Deep cyan | | | | (C-2) 3.0 | |
|  | Light cyan | | | | | (C-6) 0.8 |
| Glycerin | | 8 | 8 | 5 | 8 | 5 |
| Triethylene glycol | | 5 | 5 | 10 | 5 | 10 |
| 2-Pyrrolidone | | 5 | 5 | 5 | 5 | 5 |
| Urea | | 5 | 5 | 5 | 5 | 5 |
| Dipropylene glycol monobutyl ether | | 10 | 10 | 10 | 10 | 10 |
| Olfine STG | | 0.5 | 0.5 | 0.5 | 0.5 | 0.5 |
| EDTA* | | 0.02 | 0.02 | 0.02 | 0.02 | 0.02 |
| Proxel XL-2** | | 0.3 | 0.3 | 0.3 | 0.3 | 0.3 |
| Benzotriazole*** | | 0.01 | 0.01 | 0.01 | 0.01 | 0.01 |
| Ink set 4b | | | | | | |
| Dye | Yellow | (Y-6) 4 | | | | |
|  | Deep magenta | | (M-4) 2.2 | | | |
|  | Light magenta | | | (M-8) 1 | | |
|  | Deep cyan | | | | (C-2) 5.0 | |
|  | Light cyan | | | | | (C-2) 1.5 |
| Glycerin | | 10 | 10 | 10 | 15 | 10 |
| Diethylene glycol | | 10 | 11 | 15 | 5 | 5 |
| 1,3-Dimethyl-2-imidazolidinone | | | 5 | 5 | 5 | 8 |
| Triethylene glycol monobutyl ether | | 15 | 15 | 15 | 15 | 15 |
| Olfine E 1010 | | 0.3 | 0.3 | 0.3 | 0.3 | 0.3 |
| EDTA* | | 0.02 | 0.02 | 0.02 | 0.02 | 0.02 |
| Proxel XL-2** | | 0.3 | 0.3 | 0.3 | 0.3 | 0.3 |
| Benzotriazole*** | | 0.01 | 0.01 | 0.01 | 0.01 | 0.01 |

TABLE 6-continued

|  | Yellow | Deep magenta | Light magenta | Deep cyan | Light cyan |
|---|---|---|---|---|---|

Note)
EDTA*: Sodium ethylenediamine tetraacetate (metal masking agent)
Proxel XL-2**: Preservative (a product of Zeneca K.K.)
Benzotriazole***: Rust preventive

TABLE 7

|  |  | Yellow | Deep magenta | Light magenta | Deep cyan | Light cyan |
|---|---|---|---|---|---|---|
| Ink set 1c |  |  |  |  |  |  |
| Dye | Yellow | (Y-1) 1.2 |  |  |  |  |
|  |  | (Y-5) 1.2 |  |  |  |  |
|  | Deep magenta |  | (M-1) 2.8 |  |  |  |
|  | Light magenta |  |  | (LM-4) 2 |  |  |
|  | Deep cyan |  |  |  | (C-1) 4.0 |  |
|  | Light cyan |  |  |  |  | (C-1) 1 |
| Glycerin |  | 10 | 10 | 10 | 10 | 10 |
| Triethylene glycol |  | 8 | 5 | 8 | 5 | 10 |
| Triethanolamine |  |  | 1 | 1 |  |  |
| Diethylene glycol monobutyl ether |  | 10 |  |  |  |  |
| Triethylene glycol monobutyl ether |  |  | 10 | 10 | 10 | 10 |
| Olfine STG |  | 1 |  |  |  |  |
| Olfine E 1010 |  |  | 1 | 1 | 1 | 1 |
| EDTA* |  | 0.02 | 0.02 | 0.02 | 0.02 | 0.02 |
| Proxel XL-2** |  | 0.3 | 0.3 | 0.3 | 0.3 | 0.3 |
| Benzotriazole*** |  | 0.01 | 0.01 | 0.01 | 0.01 | 0.01 |
| Potassium hydroxide |  |  | 0.1 | 0.1 |  |  |
| Ink set 2c |  |  |  |  |  |  |
| Dye | Yellow | (Y-5) 0.5 |  |  |  |  |
|  |  | (Y-8) 3 |  |  |  |  |
|  | Deep magenta |  | (M-4) 2.4 |  |  |  |
|  | Light magenta |  |  | (LM-1) 1.8 |  |  |
|  | Deep cyan |  |  |  | (C-2) 4.5 |  |
|  | Light cyan |  |  |  |  | (C-2) 1.2 |
| Diethylene glycol |  | 5 | 5 | 5 | 5 | 5 |
| Triethylene glycol |  | 12 | 10 | 12 | 9 | 15 |
| Triethanolamine |  | 1 | 1 |  |  |  |
| 2-Pyrrolidone |  |  | 5 | 2 |  |  |
| Diethylene glycol monobutyl ether |  | 10 | 10 | 10 | 10 | 10 |
| Olfine E 1010 |  |  | 1 | 1 | 1 | 1 |
| Olfine E 104 |  | 1 |  |  |  |  |
| EDTA* |  | 0.02 | 0.02 | 0.02 | 0.02 | 0.02 |
| Proxel XL-2** |  | 0.3 | 0.3 | 0.3 | 0.3 | 0.3 |
| Benzotriazole*** |  | 0.01 | 0.01 | 0.01 | 0.01 | 0.01 |
| Potassium hydroxide |  | 0.1 |  |  |  |  |
| Ink set 3c |  |  |  |  |  |  |
| Dye | Yellow | (Y-4) 2 |  |  |  |  |
|  | Deep magenta |  | (M-7) 3 |  |  |  |
|  | Light magenta |  |  | (LM-7) 1 |  |  |
|  | Deep cyan |  |  |  | (C-2) 3.0 |  |
|  | Light cyan |  |  |  |  | (C-6) 0.8 |
| Glycerin |  | 8 | 8 | 5 | 8 | 5 |
| Triethylene glycol |  | 5 | 5 | 7 | 5 | 10 |
| 2-Pyrrolidone |  | 5 | 5 | 5 | 5 | 5 |
| Urea |  | 5 | 5 | 5 | 5 | 5 |
| Dipropylene glycol monobutyl ether |  | 10 | 10 | 10 | 10 | 10 |
| Olfine STG |  | 0.5 | 0.5 | 0.5 | 0.5 | 0.5 |
| EDTA* |  | 0.02 | 0.02 | 0.02 | 0.02 | 0.02 |
| Proxel XL-2** |  | 0.3 | 0.3 | 0.3 | 0.3 | 0.3 |
| Benzotriazole*** |  | 0.01 | 0.01 | 0.01 | 0.01 | 0.01 |
| Ink set 4c |  |  |  |  |  |  |
| Dye | Yellow | (Y-6) 4 |  |  |  |  |
|  | Deep magenta |  | (M-4) 2.2 |  |  |  |
|  | Light magenta |  |  | (LM-10) 2.5 |  |  |
|  | Deep cyan |  |  |  | (C-2) 5.0 |  |
|  | Light cyan |  |  |  |  | (C-2) 1.5 |
| Glycerin |  | 10 | 10 | 10 | 15 | 10 |

TABLE 7-continued

|  | Yellow | Deep magenta | Light magenta | Deep cyan | Light cyan |
|---|---|---|---|---|---|
| Diethylene glycol | 10 | 11 | 10 | 5 | 5 |
| 1,3-Dimethyl-2-imidazolidinone |  | 5 | 5 | 5 | 8 |
| Triethylene glycol monobutyl ether | 15 | 15 | 15 | 15 | 15 |
| Olfine E 1010 | 0.3 | 0.3 | 0.3 | 0.3 | 0.3 |
| EDTA* | 0.02 | 0.02 | 0.02 | 0.02 | 0.02 |
| Proxel XL-2** | 0.3 | 0.3 | 0.3 | 0.3 | 0.3 |
| Benzotriazole*** | 0.01 | 0.01 | 0.01 | 0.01 | 0.01 |

Note)
EDTA*: Sodium ethylenediamine tetraacetate (metal masking agent)
Proxel XL-2**: Preservative (a product of Zeneca K.K.)
Benzotriazole***: Rust preventive

TABLE 8

|  |  | Yellow | Deep magenta | Light magenta | Deep cyan | Light cyan |
|---|---|---|---|---|---|---|
| Ink set 5 (comparative example) |  |  |  |  |  |  |
| Dye | Yellow | C.I. Acid Yellow 23 2 |  |  |  |  |
|  | Deep magenta |  | C.I. Reactive Red 180 2.4 |  |  |  |
|  | Light magenta |  |  | C.I. Direct Red 227 0.8 |  |  |
|  | Deep cyan |  |  |  | C.I. Direct Blue 199 3.5 |  |
|  | Light cyan |  |  |  |  | C.I. Direct Blue 199 0.9 |
| Glycerin |  | 10 | 10 | 10 | 10 | 10 |
| Triethylene glycol |  | 10 | 5 | 10 | 5 | 10 |
| Triethanolamine |  |  | 1 | 0.3 |  |  |
| Diethylene glycol monobutyl ether |  | 10 |  |  |  |  |
| Triethylene glycol monobutyl ether |  |  | 10 | 10 | 10 | 10 |
| Olfine STG |  | 1 |  |  |  |  |
| Olfine E 1010 |  |  | 1 | 1 | 1 | 1 |
| EDTA* |  | 0.02 | 0.02 | 0.02 | 0.02 | 0.02 |
| Proxel XL-2** |  | 0.3 | 0.3 | 0.3 | 0.3 | 0.3 |
| Benzotriazole*** |  | 0.01 | 0.01 | 0.01 | 0.01 | 0.01 |
| Potassium hydroxide |  |  | 0.1 | 0.03 |  |  |
| Ink set 6 (comparative example) |  |  |  |  |  |  |
| Dye | Yellow | (Y-5) 0.5 (Y-8) 3 |  |  |  |  |
|  | Deep magenta |  | C.I. Acid Red 52 1.4 |  |  |  |
|  | Light magenta |  |  | (M-4) 0.7 |  |  |
|  | Deep cyan |  |  |  | C.I. Acid Blue 9 2.5 |  |
|  | Light cyan |  |  |  |  | C.I. Direct Blue 86 1 |
| Diethylene glycol |  | 5 | 5 | 5 | 5 | 5 |
| Triethylene glycol |  | 12 | 10 | 18 | 9 | 15 |
| Triethanolamine |  | 1 |  |  |  |  |
| 2-Pyrrolidone |  |  |  | 2 |  |  |
| Diethylene glycol monobutyl ether |  | 10 | 10 | 10 | 10 | 10 |
| Olfine E 1010 |  |  | 1 | 1 | 1 | 1 |
| Olfine E 104 |  | 1 |  |  |  |  |
| EDTA* |  | 0.02 | 0.02 | 0.02 | 0.02 | 0.02 |
| Proxel XL-2** |  | 0.3 | 0.3 | 0.3 | 0.3 | 0.3 |
| Benzotriazole*** |  | 0.01 | 0.01 | 0.01 | 0.01 | 0.01 |
| Potassium hydroxide |  | 0.1 | 0.1 |  |  |  |
| Ink set 7 (comparative example) |  |  |  |  |  |  |
| Dye | Yellow | (Y-5) 1.2 (Y-8) 1.2 |  |  |  |  |
|  | Deep magenta |  | (M-1) 2.8 |  |  |  |

TABLE 8-continued

|  | Yellow | Deep magenta | Light magenta | Deep cyan | Light cyan |
|---|---|---|---|---|---|
| Light magenta |  |  | (M-4) 0.7 |  |  |
| Deep cyan |  |  |  | C.I. Acid Blue 199 3.5 |  |
| Light cyan |  |  |  |  | C.I. Direct Blue 86 1 |
| Glycerin | 10 | 10 | 10 | 10 | 10 |
| Triethylene glycol | 8 | 5 | 10 | 5 | 10 |
| Triethanolamine |  | 1 | 0.3 |  |  |
| Diethylene glycol monobutyl ether | 10 |  |  |  |  |
| Triethylene glycol monobutyl ether |  | 10 | 10 | 10 | 10 |
| Olfine STG | 1 |  |  |  |  |
| Olfine E 1010 |  | 1 | 1 | 1 | 1 |
| EDTA* | 0.02 | 0.02 | 0.02 | 0.02 | 0.02 |
| Proxel XL-2** | 0.3 | 0.3 | 0.3 | 0.3 | 0.3 |
| Benzotriazole*** | 0.01 | 0.01 | 0.01 | 0.01 | 0.01 |
| Potassium hydroxide |  | 0.1 | 0.03 |  |  |

Note)
EDTA*: Sodium ethylenediamine tetraacetate (metal masking agent)
Proxel XL-2**: Preservative (a product of Zeneca K.K.)
Benzotriazole***: Rust preventive Test on evaluation of ink sets The magenta ink compositions thus obtained were evaluated by the following tests 1B to 3B using the recording media (1) to (4) as used in the evaluation test A.

In the evaluation tests, an ink jet printer PM-770C (manufactured by Seiko Epson Corporation) was used.

Test 1B: Lightfastness

Each of the ink sets was loaded into an ink cartridge for PM-770C (Model IC5CL02, manufactured by Seiko Epson Corporation), and blotted images of red, blue, green, and composite black with a density of 70% were printed on the recording media (1) to (4).

In this case, printing was carried out under conditions controlled such that the red with a density of 70% was constituted by the deep magenta ink, the light magenta ink, and the yellow ink, the blue with a density of 70% was constituted by the deep magenta ink, the light magenta ink, the deep cyan ink, and the light cyan ink, the green with a density of 70% was constituted by the yellow ink, the deep cyan ink, and the light cyan ink, and the composite black with a density of 70% was constituted by the deep magneta ink, the light magneta ink, the deep cyan ink, the light cyan ink, the yellow ink, and the black ink. The black ink used was an original ink for PM-770C.

These print samples were subjected to a 60-hr lightfastness test using a xenon fadeometer Ci35W (manufactured by Atlas Electric Device). The difference between the color before the test and the color after the test, $\Delta E^*_{ab}$, was determined by equation (i), and evaluated according to the following criteria.

$$\Delta E^*_{ab} = [(\Delta L^*)^2 + (\Delta a^*)^2 + (\Delta b^*)^2]^{1/2} \quad (i)$$

A: Color difference $\Delta E^*_{ab}$ of not more than 5
B: Color difference $\Delta E^*_{ab}$ of more than 5 to 10
C: Color difference $\Delta E^*_{ab}$ of more than 10 to 20
D: Color difference $\Delta E^*_{ab}$ of more than 20

The results were as summarized in Tables 9.

TABLE 9

Test 1B: Lightfastness

|  |  | Recording medium | | | |
|---|---|---|---|---|---|
| Print with density 70% |  | (1) | (2) | (3) | (4) |
| Ink set 1b | Red | A | A | A | A |
|  | Blue | B | B | A | B |
|  | Green | A | A | A | A |
|  | Black | B | B | A | B |
| Ink set 2b | Red | A | A | A | A |
|  | Blue | B | B | A | B |
|  | Green | A | A | A | A |
|  | Black | B | B | A | B |
| Ink set 3b | Red | A | A | A | A |
|  | Blue | B | B | A | B |
|  | Green | A | A | A | A |
|  | Black | B | B | A | B |
| Ink set 4b | Red | A | A | A | A |
|  | Blue | B | B | A | B |
|  | Green | A | A | A | A |
|  | Black | B | B | A | B |
| Ink set 1c | Red | A | A | A | A |
|  | Blue | A | A | A | A |
|  | Green | A | A | A | A |
|  | Black | A | A | A | A |
| Ink set 2c | Red | A | A | A | A |
|  | Blue | A | A | A | A |
|  | Green | A | A | A | A |
|  | Black | A | A | A | A |
| Ink set 3c | Red | A | A | A | A |
|  | Blue | A | A | A | A |
|  | Green | A | A | A | A |
|  | Black | A | A | A | A |
| Ink set 4c | Red | A | A | A | A |
|  | Blue | A | A | A | A |
|  | Green | A | A | A | A |
|  | Black | A | A | A | A |
| Ink set 5 | Red | D | D | D | D |
|  | Blue | B | C | C | C |
|  | Green | B | B | B | B |
|  | Black | D | D | D | D |
| Ink set 6 | Red | D | D | D | D |
|  | Blue | D | D | C | D |
|  | Green | D | D | D | C |
|  | Black | D | D | D | D |

TABLE 9-continued

Test 1B: Lightfastness

| | | Recording medium | | | |
|---|---|---|---|---|---|
| | Print with density 70% | (1) | (2) | (3) | (4) |
| Ink set 7 | Red | A | A | A | A |
| | Blue | D | D | C | D |
| | Green | A | A | A | A |
| | Black | D | D | D | D |

Test 2B: Color reproduction range

The ink sets 1b to 4c and the ink sets 5 to 7 were loaded into ink cartridges for PM-770C, and, for each of these ink sets, a patch pattern with gradation of 100 density levels was printed on the recording medium (3) for each of yellow, magenta, cyan, red, blue, and green. For the patches, lightness (L*) and hue (a*, b*) were measured. a* was plotted as X axis, b* as Y axis, and L* as Z axis to determine a color solid space (a color reproduction range).

The color reproduction range of the original ink set for PM-770C was presumed to be 100% and was compared with the color reproduction range of each ink set.

Test 3B: Recovery from clogging

Each of the ink sets 1b to 4c and the ink sets 5 to 7 was loaded into a printing head of PM-770C, and allowed to stand without capping the printing head under an environment of 40° C. for one month. After the standing for one month, the number of cleaning operations required for all the nozzles to normally eject the ink compositions in the ink set was counted, and the recovery from clogging was evaluated according to the following criteria.

A: Recovered by repeating the cleaning operation twice or less

B: Recovered by repeating the cleaning operation three to five times

C: Recovered by repeating the cleaning operation six to ten times

D: Not recovered even by repeating the cleaning operation ten times

The results of evaluation in the test 2B and the test 3B were as summarized in Tables 10 and 11.

TABLE 10

| | Ink set | | | | | | | |
|---|---|---|---|---|---|---|---|---|
| | 1b | 2b | 3b | 4b | 5 | 6 | 7 | PM-770C |
| Test 2B: Color reproduction range | 95% | 98% | 97% | 93% | 88% | 104% | 97% | 100% |
| Test 3B: Recovery from clogging | A | A | A | A | B | B | A | A |

TABLE 11

| | Ink set | | | | | | | |
|---|---|---|---|---|---|---|---|---|
| | 1c | 2c | 3c | 4c | 5 | 6 | 7 | PM-770C |
| Test 2B: Color reproduction range | 95% | 101% | 97% | 95% | 88% | 104% | 97% | 100% |

TABLE 11-continued

| | Ink set | | | | | | | |
|---|---|---|---|---|---|---|---|---|
| | 1c | 2c | 3c | 4c | 5 | 6 | 7 | PM-770C |
| Test 3B: Recovery from clogging | A | A | A | A | B | B | A | A |

What is claimed is:

1. An ink set comprising: a yellow ink composition; first and second magenta ink compositions different from each other in color density, wherein the first magenta ink composition has a higher color density and the second magenta ink composition has a lower color density; and first and second cyan ink compositions different from each other in color density, wherein the first cyan ink composition has a higher color density and the second cyan ink composition has a lower color density, said yellow ink composition containing as a colorant a compound represented by formula (I) or (II):

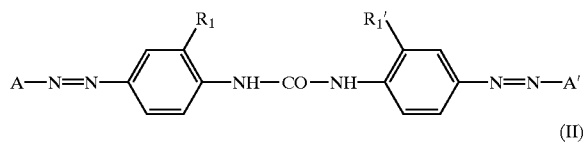

(I)

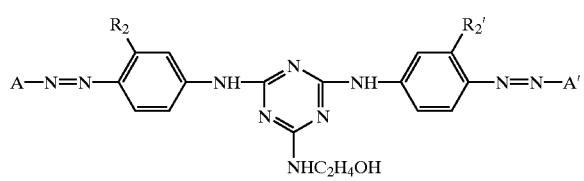

(II)

wherein $R_1$, $R_1'$, $R_2$, and $R_2'$ each independently represent $CH_3$ or $OCH_3$; and A and A' each independently represent a group having a structure selected from the group consisting of

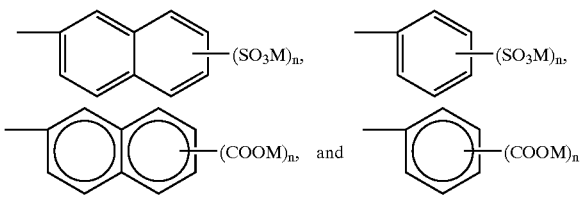

wherein

M represents a hydrogen atom, lithium, sodium, potassium, ammonium, or an organic amine; and n is an integer of 1 or 2, said first magenta ink composition with higher color density containing as a colorant a compound represented by formula (III):

(III)

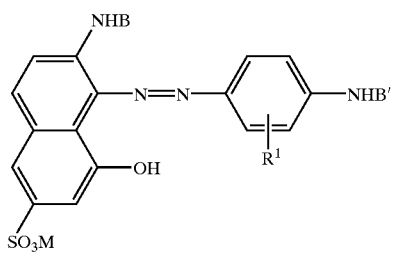

wherein
B and B' each independently represent a hydrogen atom or a group represented by formula

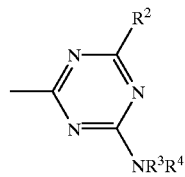

wherein
$R^2$ represents OH, COOM, or $NHR^5$ wherein $R^5$ represents an $SO_3M$— or COOH-substituted $C_1$–$C_4$ alkyl group;
$R^3$ represents a hydrogen atom or an OH— or COOH-substituted $C_1$–$C_4$ alkyl group; and
$R^4$ represents an OH—, $OCH_3$—, $OC_2H_5$—, $SO_3M$—, or COOM-substituted $C_1$–$C_4$ alkyl or phenyl group, provided that B and B' do not simultaneously represent a hydrogen atom;
$R^1$ represents a $C_1$–$C_4$ alkyl or alkoxy group, OH, $SO_3M$, or COOH; and
M represents a hydrogen atom, lithium, sodium, potassium, ammonium, or an organic amine,
said second magenta ink composition with lower color density containing as a colorant the compound represented by formula (III) or a compound represented by formula (V):

(V)

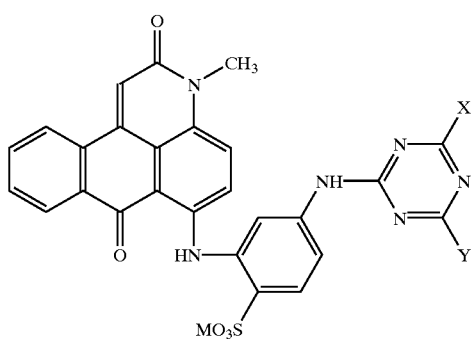

wherein
X represents an anilino group substituted by at least one $SO_3M$;
Y represents OH, Cl, or a morpholino group; and M represents a hydrogen atom, lithium, sodium, potassium, ammonium, or an organic amine,
said first cyan ink composition with higher color density and said second cyan ink composition with lower color density each containing as a colorant a compound represented by formula (IV):

(IV)

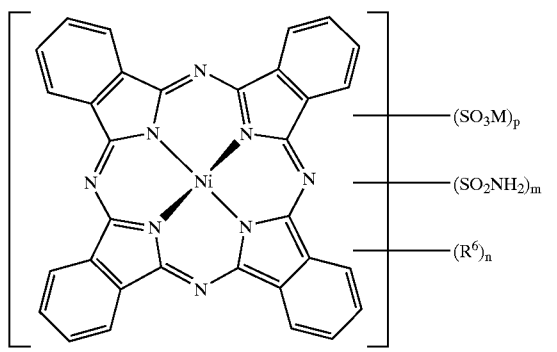

wherein
$R^6$ represents OH or COOM; and
p, m, and n are each 0 to 4 with (p+m+n)=4.

2. The ink set according to claim 1, wherein the content of the compound represented by formula (I) or (II) in the yellow ink composition is 1.5 to 4% by weight.

3. The ink set according to claim 1, wherein the first magenta ink composition with higher color density contains 1.5 to 3.5% by weight of the compound represented by formula (III) and the second magenta ink composition with lower color density contains 0.2 to 0.9% by weight of the compound represented by formula (III).

4. The ink set according to claim 1, wherein the first magenta ink composition with higher color density contains 0.5 to 4% by weight of the compound represented by formula (III) and the second magenta ink composition with lower color density contains 1 to 3% by weight of the compound represented by formula (V).

5. The ink set according to claim 1, wherein the first cyan ink composition with higher color density contains 2.5 to 4.5% by weight of the compound represented by formula (IV) and the second cyan ink composition with lower color density contains 0.4 to 1.5% by weight of the compound represented by formula (IV).

6. The ink set according to any claim 1, which further comprises a black ink composition.

7. The ink set according to claim 1, wherein each of the yellow, first and second magenta, and first and second cyan ink compositions further contains a surfactant.

8. An ink set comprising first and second magenta ink compositions different from each other in color density, wherein the first magenta ink composition has a higher color density and the second magenta ink composition has a lower color density, the first magenta ink composition with higher color density containing as a colorant the compound represented by formula (III)

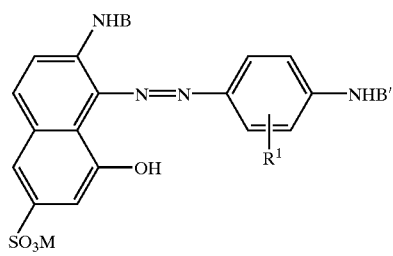

(III)

wherein

B and B' each independently represent a hydrogen atom or a group represented by formula

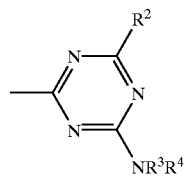

wherein $R^2$ represents OH, COOM, or $NHR^5$ wherein $R^5$ represents an $SO_3M$— or COOH-substituted $C_1$–$C_4$ alkyl group;

$R^3$ represents a hydrogen atom or an OH— or COOH-substituted $C_1$–$C_4$ alkyl group; and $R^4$ represents an OH—, $OCH_3$—, $OC_2H_5$—, $SO_3M$—, or COOM-substituted $C_1$–$C_4$ alkyl or phenyl group, provided that B and B' do not simultaneously represent a hydrogen atom;

$R^1$ represents a $C_1$–$C_4$ alkyl or alkoxy group, OH, $SO_3M$, or COOH; and

M represents a hydrogen atom, lithium, sodium, potassium, ammonium, or an organic amine, the second magenta ink composition with lower color density containing as a colorant the compound represented by formula (V)

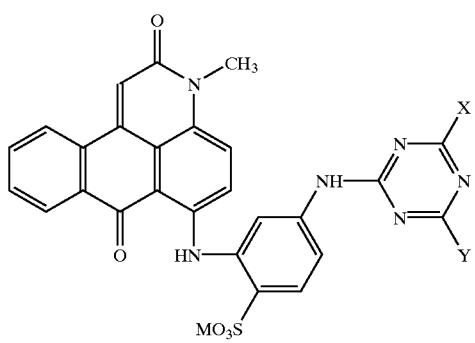

(V)

wherein

X represents an anilino group substituted by at least one $SO_3M$;

Y represents OH, Cl, or a morpholino group; and

M represents a hydrogen atom, lithium, sodium, potassium, ammonium, or an organic amine.

9. The ink set according to claim 8, wherein the first magenta ink composition with higher color density contains 0.5 to 4% by weight of the compound represented by formula (III) and the second magenta ink composition with lower color density contains 1 to 3% of the compound represented by formula (V).

10. The ink set according to claim 8, which further comprises a yellow ink composition and a cyan ink composition.

11. The ink set according to claim 8, which further comprises a black ink composition.

12. The ink set according to claim 8, wherein each of the first and second magenta ink compositions further contains a surfactant.

13. A method for recording comprising:
   (a) providing the ink set according to claim 1; and
   (b) depositing onto a recording medium to perform printing each of the yellow, first magenta, second magenta, first cyan and second cyan ink compositions.

14. A method for ink ret recording comprising:
   (a) providing the ink set according to claim 1; and
   (b) ejecting droplets of each of the yellow, first magenta, second magenta, first cyan and second cyan ink compositions and depositing the droplets onto a recording medium to perform printing.

15. A record produced by the recording method of claim 13.

16. A method for recording comprising:
   (a) providing the ink set according to claim 8; and
   (b) depositing onto a recording medium to perform printing each of the yellow, first magenta, second magenta, first cyan and second cyan ink compositions.

17. A method for ink ret recording comprising:
   (a) providing the ink set according to claim 8; and
   (b) ejecting droplets of each of the yellow, first magenta, second magenta, first cyan and second cyan ink compositions and depositing the droplets onto a recording medium to perform printing.

18. A record produced by the recording method of claim 16.

* * * * *